Feb. 22, 1927.

W. A. HATCHER 1,618,378

VACUUM CHUCK FOR BEARING CONES

Filed Nov. 12, 1924

Inventor
William Albert Hatcher

Attorneys

Patented Feb. 22, 1927.

1,618,378

UNITED STATES PATENT OFFICE.

WILLIAM ALBERT HATCHER, OF DETROIT, MICHIGAN, ASSIGNOR TO CRESCENT PUMP COMPANY, OF DETROIT, MICHIGAN, A CORPORATION OF MICHIGAN.

VACUUM CHUCK FOR BEARING CONES.

Application filed November 12, 1924. Serial No. 749,553.

The invention relates to vacuum chucking fixtures and is particularly concerned with an apparatus for mounting tapered roller bearing cones upon a rotatable arbor in such a manner as to be accurately centered and firmly clamped while grinding the cylindrical hole therein.

The primary object of the invention is to provide a vacuum operated fixture which will permit quick and accurate mounting of the cones upon the rotary arbor so as to cut down the time loss in chucking.

Other objects reside in the more specific details of construction as hereinafter fully set forth and illustrated in the accompanying drawings wherein.

Figures 1, 2:
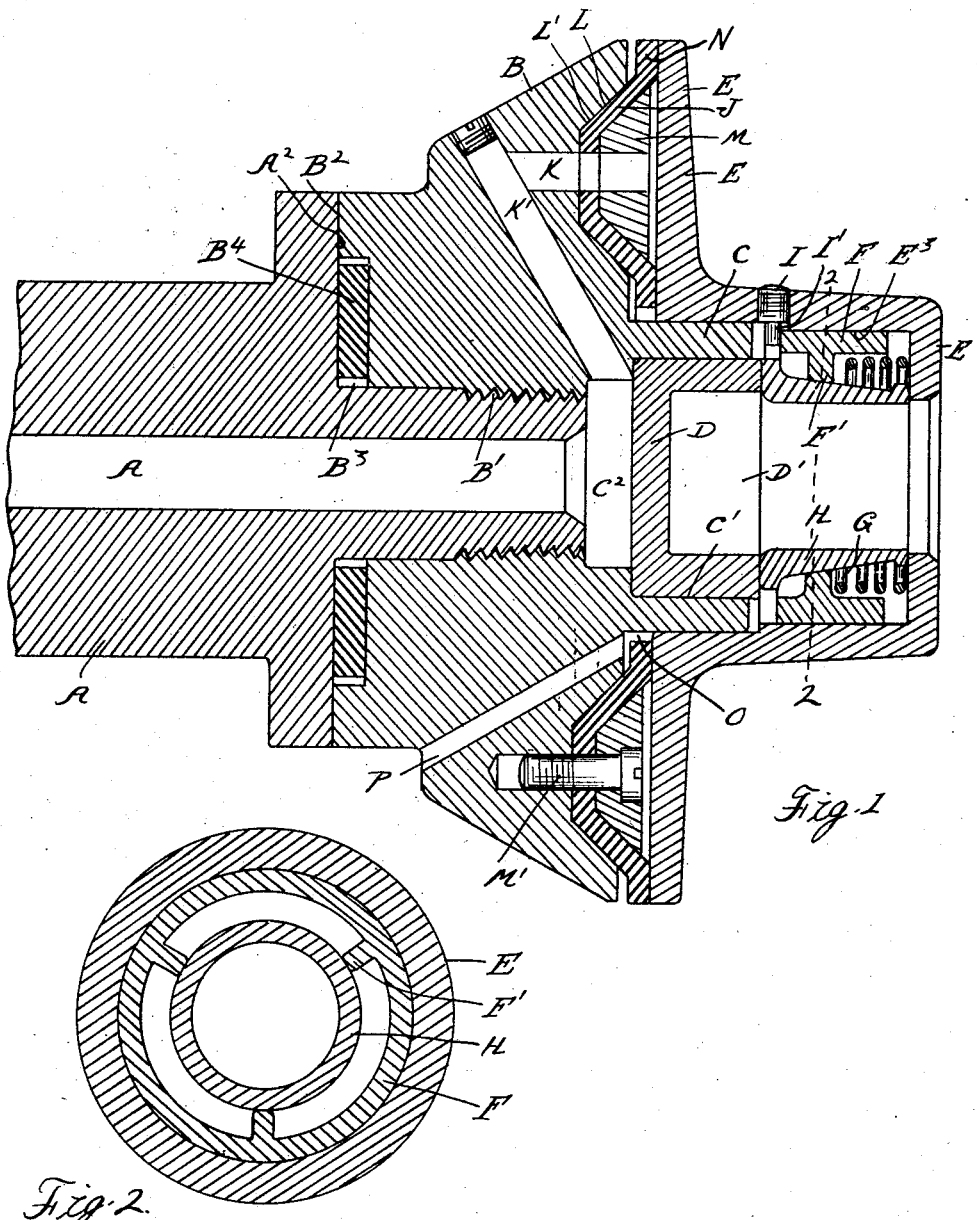
Figure 1 is a longitudinal section through the chuck.
Figure 2 is an end elevation thereof partly in section taken on the line 2—2 of Figure 1.

The vacuum chuck comprises a rotatable arbor A adapted to be suitably secured in a grinding machine or other rotating mechanism and provided with an interior bore A' adapted to be connected to a suitable source of high vacuum (not shown). The arbor is provided with a head portion B suitably secured thereto, for example, by the threaded connection B'. The head B has the shoulders B² engaging the flange A² of the arbor and is provided with a recess B³ for receiving a suitable gasket B⁴. The opposite end of the head B has a projecting cylindrical hub C provided with a central bore C' for receiving an insert D, the latter seating against the annular shoulders formed by the bore C' and being held in position by the vacuum maintained in the annular space C² in the rear of said insert.

E is a sleeve having a sliding fit on the hub C and provided with the laterally extending annular flange E' at one end thereof and the inwardly projecting flange E² at the opposite end thereof. The sleeve has a cylindrical inner surface E³ for receiving a sliding centering ring F, the latter being provided with inwardly extending centering points F', preferably three in number. G is a coil spring arranged between the flange E² and the ring F for yieldingly urging the latter into engagement with the conical surface of the bearing cone H. With this arrangement the bearing cone may be inserted in the sleeve E while the latter is removed from the arbor after which the sleeve is again placed upon the hub C and moved longitudinally thereon until the bearing cone H is clamped between the insert D and the flange E². I is a set screw inserted through the sleeve E having the inner projecting portion I' arranged to limit the movement of the centering ring so as to prevent the latter from falling out of the sleeve upon the removal of the same.

For holding the sleeve to the arbor head and clamping for bearing cone in position there is an annular vacuum cup J arranged to form a sealing contact with the annular flange E' and to evacuate the air adjacent to said flange through the vacuum passageways K and K' leading to the central bore A' of the arbor. In forming the vacuum cup J, the head B is preferably provided with the grooved recess L having sloping sides L' and a sheet of gum rubber or other suitable resilient material is arranged in said recess and clamped thereto by the ring-shaped clamp M and the clamping screws M'. The marginal portions N of the gum rubber sheet are thus brought into contact with the annular flange E' and upon the connection of the arbor to a vacuum source the sleeve is drawn inwardly upon the hub C until the work piece or bearing cone H is firmly clamped.

The grinder wheel may then be brought into engagement with the inner surface of the bearing cone in order to grind the same and to prevent interference, the insert D has a recess D' therein a slightly larger diameter than the hole in the bearing cone.

One of the advantages of the fixture as above described is that there is a constant pressure upon the bearing cone holding the same in position as long as the vacuum remains constant and this is independent of any variation of the length of the work piece. Another advantage of the apparatus is that the clamping is effected by merely applying the vacuum to the apparatus which may be accomplished by means of a suitable controlling valve.

In removing the article from the chuck the controlling valve is turned to cut off the vacuum supply and vent the vacuum cups to the atmosphere as will be readily understood whereupon the sleeve may be withdrawn from the hub C. The sleeve has a close sliding fit upon the hub C and to prevent the possibility of a vacuum being maintained in the recess O adjacent the vacuum cup J by reason of the close fit, the head is provided with an air vent P which prevents the building up of a vacuum in said recess.

What I claim as my invention is:—

1. A rotary vacuum chuck comprising a rotatable body having a seat for receiving the work piece, a work clamping sleeve slidable on said body and adapted to engage the work piece, and vacuum means on said chuck adapted to hold said sleeve in position to securely clamp said work piece between said seat and said sleeve.

2. A rotary vacuum chuck comprising an arbor, a work clamping sleeve longitudinally slidable thereon having an outwardly extending annular flange, a seat for the work piece within said sleeve, inward projections in said sleeve spaced from said seat to receive and clamp a work piece therebetween, and vacuum means on said chuck contacting with said annular flange to securely hold said sleeve in work clamping position.

3. A rotary vacuum chuck for bearing cones comprising an arbor having a projecting cylindrical end portion, a work clamping sleeve slidable on said end portion provided with an annular flange, an annular vacuum cup secured to said arbor contacting with said flange to securely hold said sleeve in work clamping position, a seat on said arbor within said sleeve, an abutment upon said sleeve spaced from said arbor to receive and clamp a bearing cone therebetween, and means for automatically centering said bearing cone within said sleeve.

4. A rotary vacuum chuck comprising a rotatable arbor, a work clamping sleeve longitudinally slidable thereon, provided with means for engaging the work piece to clamp the same against said arbor, and vacuum means for securely holding said sleeve in work clamping position.

5. A rotary vacuum chuck comprising a rotatable arbor, a work clamping sleeve longitudinally slidable thereon provided with means for engaging the work piece to clamp the same against said arbor, vacuum means for securely holding said sleeve in work clamping position, and means for centering the work within said sleeve.

6. A rotary vacuum chuck for bearing cones comprising an arbor having a projecting cylindrical hub, a work clamping sleeve slidable on said hub provided with an annular flange, an annular vacuum cup secured to said arbor contacting with said flange to securely hold said sleeve in work clamping position, a seat on said arbor within said sleeve, an abutment upon said sleeve spaced from said seat to receive and clamp a bearing cone therebetween, a ring within said sleeve having projecting centering points, and a spring between said ring and the abutment on said sleeve.

7. A rotary vacuum chuck for supporting bearing cones and the like comprising an arbor having a hub, a work clamping sleeve longitudinally slidable on said hub, means carried by said sleeve for centering a bearing cone, abutments on said sleeve and said arbor for clamping the bearing cone therebetween, a vacuum cup arranged to form a sealing engagement with said sleeve, and vacuum passageways leading to said vacuum cup.

8. A rotary vacuum chuck comprising an arbor having a head portion provided with a projecting hub, a clamping member longitudinally slidable on said hub, means upon said clamping member for centering the work piece thereon, and a vacuum cup arranged to form a sealing engagement with said sleeve to securely hold said sleeve in work clamping position.

9. A rotary vacuum chuck comprising an arbor having a hub projecting therefrom, a member insertable within said hub having a seat for receiving one end of a bearing cone, a work clamping sleeve longitudinally slidable on said hub and having an abutment for engaging the opposite end of said bearing cone, a ring slidable within said sleeve and having inwardly projecting centering points for engaging the conical surface of the bearing cone, a spring disposed between the said ring and said abutment, and a vacuum cup on said arbor arranged to form a vacuum seal with said sleeve to securely hold said sleeve in work clamping position.

In testimony whereof I affix my signature.

WILLIAM ALBERT HATCHER.